(12) United States Patent
Itami et al.

(10) Patent No.: US 11,588,248 B2
(45) Date of Patent: Feb. 21, 2023

(54) FREQUENCY SELECTIVE SURFACE DESIGNING DEVICE

(71) Applicant: Nippon Telegraph and Telephone Corporation, Tokyo (JP)

(72) Inventors: Go Itami, Tokyo (JP); Yohei Toriumi, Tokyo (JP); Jun Kato, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 32 days.

(21) Appl. No.: 17/289,835

(22) PCT Filed: Oct. 16, 2019

(86) PCT No.: PCT/JP2019/040738
§ 371 (c)(1),
(2) Date: Apr. 29, 2021

(87) PCT Pub. No.: WO2020/090482
PCT Pub. Date: May 7, 2020

(65) Prior Publication Data
US 2021/0408693 A1 Dec. 30, 2021

(30) Foreign Application Priority Data

Oct. 30, 2018 (JP) .............................. JP2018-203815

(51) Int. Cl.
*H01Q 15/00* (2006.01)
*H01Q 15/14* (2006.01)

(52) U.S. Cl.
CPC ....... *H01Q 15/0046* (2013.01); *H01Q 15/002* (2013.01); *H01Q 15/141* (2013.01)

(58) Field of Classification Search
CPC ............. H01Q 15/0006; H01Q 15/002; H01Q 15/0046; H01Q 15/006; H01Q 15/0066;
(Continued)

(56) References Cited

U.S. PATENT DOCUMENTS

2007/0188385 A1* 8/2007 Hyde .................... H01Q 15/002
343/700 MS
2008/0048917 A1* 2/2008 Achour .................... H01Q 1/38
343/700 MS
(Continued)

FOREIGN PATENT DOCUMENTS

| CN | 112733397 A | * | 4/2021 | | |
| WO | WO-2016062344 A1 | * | 4/2016 | ......... | H01Q 15/0046 |
| WO | WO-2021015328 A1 | * | 1/2021 | ........... | H01Q 17/001 |

OTHER PUBLICATIONS

F. Costa, A. Monorchio and G. Manara, "Efficient Analysis of Frequency-Selective Surfaces by a Simple Equivalent-Circuit Model," in IEEE Antennas and Propagation Magazine, vol. 54, No. 4, pp. 35-48, Aug. 2012, doi: 10.1109/MAP.2012.6309153. (Year: 2012).*
(Continued)

*Primary Examiner* — Dameon E Levi
*Assistant Examiner* — Leah Rosenberg
(74) *Attorney, Agent, or Firm* — Fish & Richardson P.C.

(57) ABSTRACT

To accurately estimate frequency characteristics from structural parameters of a frequency selective surface. A frequency selective surface design apparatus includes an LC generation unit 20 that receives an input of a structural parameter, and generates an inductance L and a capacitance C of a unit cell, a corrected resonance point calculation unit 30 that receives the number n of times of calculation input from an outside, the inductance L, and the capacitance C, models a correction circuit by using a circuit in which a virtual capacitance is connected in parallel via a transmission line to each distribution inductance obtained by division of the inductance L by the calculation number n and the transmission line is terminated at the capacitance C, and calculates a corrected resonant frequency fC from the impedance of the correction circuit, and a characteristic calculation unit 40 that receives inputs of the inductance L,
(Continued)

the capacitance C, and the corrected resonant frequency fC, calculates a pre-correction resonant frequency from the inductance L and the capacitance C, obtains a correction coefficient by dividing the corrected resonant frequency fC by the pre-correction resonant frequency, and calculates a corrected return loss and a corrected insertion loss.

5 Claims, 13 Drawing Sheets

(58) Field of Classification Search
CPC ................ H01Q 15/14; H01Q 15/141; H01Q 15/0013–0093
See application file for complete search history.

(56) References Cited

U.S. PATENT DOCUMENTS

2015/0346039 A1* 12/2015 Ito ........................... H01Q 7/00
374/117
2016/0004954 A1* 1/2016 Le Baron ............... H01Q 7/005
235/492
2017/0125892 A1* 5/2017 Arbabian ............. A61B 5/0028

OTHER PUBLICATIONS

G. Itami, Y. Toriumi and Y. Akiyama, "A novel design method for miniaturizing FSS based on theory of meta-materials," 2017 International Symposium on Antennas and Propagation (ISAP), 2017, pp. 1-2, doi: 10.1109/ISANP.2017.8228742. (Year: 2017).*

Hsing-Yi Chen, Tsung-Han Lin, and Pei-Kuen Li, Jul. 2015, Fast Design of Jerusalem-Cross Parameters by Equivalent Circuit Model and Least-Square Curve Fitting Technique, ACES Journal, vol. 30, No. 7, p. 717-730. (Year: 2015).*

Makino et al., "[Tutorial Lecture] Basic Design Theory of Frequency Selective Reflector and its Applications," IEICE Technical Report, 2015, 20 pages (with English Translation).

Munk et al., "Frequency Selective Surfaces Theory and Design," Wiley-fnterscience, Apr. 26, 2000, pp. 52-53.

* cited by examiner

FREQUENCY SELECTIVE SURFACE DESIGNING DEVICE

CROSS-REFERENCE TO RELATED APPLICATIONS

This application is a National Stage application under 35 U.S.C. § 371 of International Application No. PCT/JP2019/040738, having an International Filing Date of Oct. 16, 2019, which claims priority to Japanese Application Serial No. 2018-203815, filed on Oct. 30, 2018. The disclosure of the prior application is considered part of the disclosure of this application, and is incorporated in its entirety into this application.

TECHNICAL FIELD

The present invention relates to a frequency selective surface design apparatus for supporting design of a frequency selective surface in which unit cells of resonators are arranged on a plane.

BACKGROUND ART

Wireless communication services using a channel such as a wireless LAN or LTE have rapidly become popular due to advancement of miniaturization and high functionality of information communication devices. Accordingly, transmission and reception of radio waves to/from wireless communication terminals have been performed broadly and frequently, and there is a concern about influence on other peripheral electronic devices.

As consequences, deterioration of wireless environment, communication failure, threats to security, and the like, are concerns. Techniques for reducing such influence have been demanded.

Frequency selective surfaces (FSS) can be used for the purpose of controlling radio wave environment and electromagnetic environment. The frequency selective surface is configured such that resonators (unit cells) formed with a conductor pattern with dimensions of equal to or less than a wavelength are arranged at intervals, and thus, transmission characteristics/reflection characteristics of incident electromagnetic waves have frequency dependency.

Some frequency selective surfaces have resonance structures with various frequency characteristics. For example, a frequency selective surface having band stop filter characteristics that reflect only a specific frequency is mainly one having a conductor portion as a resonance structure, and there are a ring type, a dipole array type, a trihole type, a patch type, and a Jerusalem cross type (Non Patent Literature (NPL) 1).

The frequency selective surface has a large number of structural parameters to be taken into consideration, and the parameters may conflictingly relate to an increase/decrease in an inductance component and a capacitance component. Further, depending on the way to arrange the unit cells, the characteristics change, and are theoretically complicated (NPL 2).

CITATION LIST

Non Patent Literature

NPL 1: Shigeru Makino, "'Tutorial' Basic Design Theory of Frequency Selective Reflector and its Applications", IEICE Technical Report, A•P 2015-5, Apl. 2015.

NPL 2: BEN A. MUNK, "Frequency Selective Surfaces Theory and Design", 2000.

SUMMARY OF THE INVENTION

Technical Problem

From the structural parameters of the frequency selective surface, the frequency characteristics thereof can be estimated based on an existing theoretical formula. However, there is large deviation from actual characteristics, and there is no method for improving such deviation. In other words, there is no method for accurately estimating the frequency characteristics of the frequency selective surface from the structural parameters thereof based on a physical principle. For this reason, design of the frequency selective surface has a problem in which such design requires cost and effort.

The present invention has been made in view of this problem, and an object of the present invention is to provide a frequency selective surface design apparatus capable of accurately estimating frequency characteristics of a frequency selective surface from structural parameters thereof.

Means for Solving the Problem

A frequency selective surface design apparatus according to one aspect of the present invention is a frequency selective surface design apparatus for supporting design of a frequency selective surface in which a unit cell of a resonator is arranged on a plane, the frequency selective surface design apparatus including: an LC generation unit configured to receive an input of a structural parameter representing a structure of the unit cell, and generate an inductance and a capacitance of the unit cell; a corrected resonance point calculation unit configured to receive inputs of the number of times of calculation input from an outside, the inductance, and the capacitance, model a correction circuit by using a circuit in which a virtual capacitance is connected in parallel via a transmission line to each of distribution inductances obtained by division of the inductance by the calculation number and the transmission line is terminated at the capacitance, and calculate a corrected resonant frequency from an impedance of the correction circuit in which the virtual capacitance causes a phase difference generated in the unit cell and a phase difference generated in the transmission line to match with each other; and a characteristic calculation unit configured to receive inputs of the inductance, the capacitance, and the corrected resonant frequency, calculate a pre-correction resonant frequency from the inductance and the capacitance, obtain a correction coefficient by dividing the corrected resonant frequency by the pre-correction resonant frequency, and calculate a corrected return loss and a corrected insertion loss by multiplying each of a pre-correction return loss and a pre-correction insertion loss by the correction coefficient.

Effects of the Invention

According to the present invention, the frequency characteristics can be accurately estimated from the structural parameters of the frequency selective surface.

DESCRIPTION OF EMBODIMENTS

Before description of embodiments of the present invention, a unit cell of a resonator according to the present invention and structural parameters thereof will be described with reference to the drawings.

Unit Cell

A frequency selective surface is configured such that unit cells of resonators formed in a conductor pattern with dimensions of equal to or less than a wavelength are arranged at a constant pitch p. The structure of the unit cell includes, for example, a ring type, a dipole array type, a trihole type, a patch type, and a Jerusalem cross type.

Figure 1:
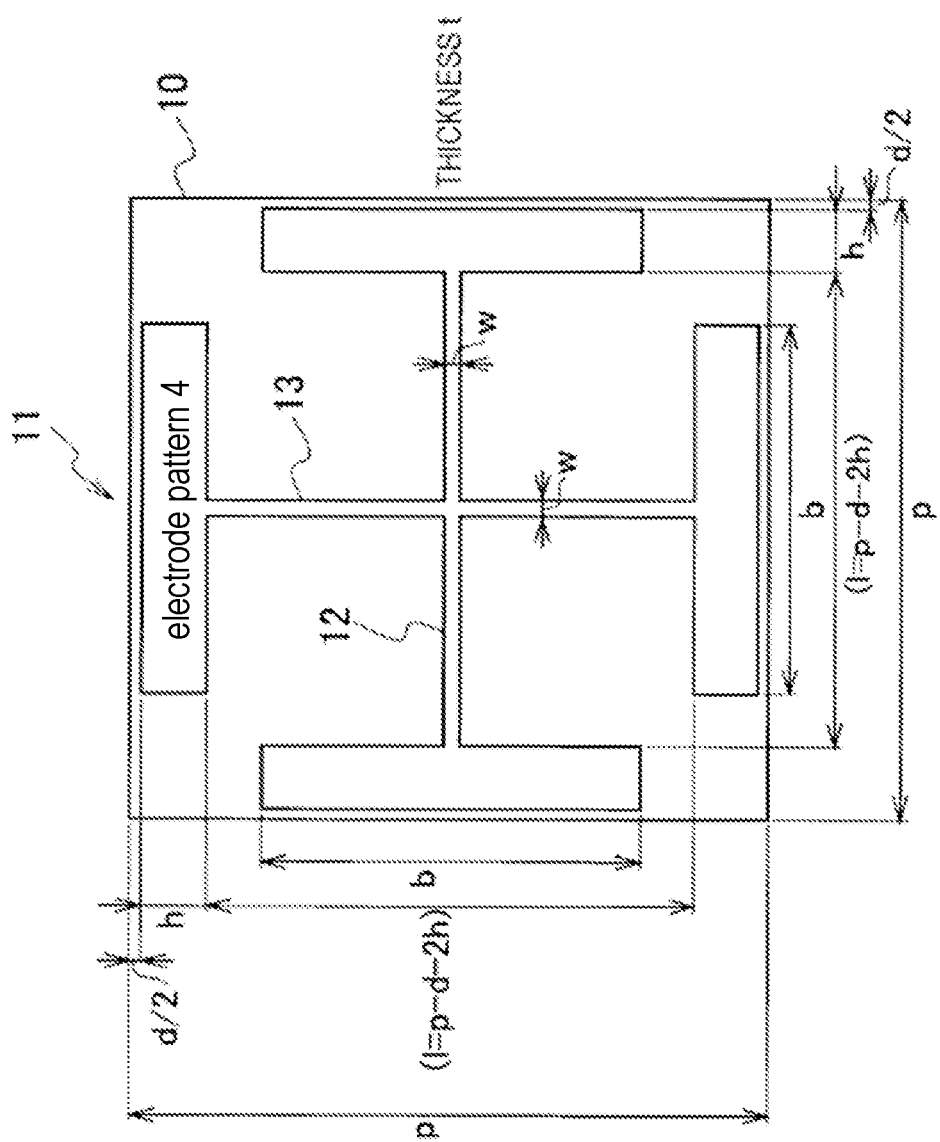
FIG. 1 is a diagram schematically illustrating a plan view of a Jerusalem cross type unit cell.

Of these types, the model that formulation of a resonant frequency is relatively easy is the Jerusalem cross type. FIG. 1 is a diagram schematically illustrating a plan view of a Jerusalem cross type unit cell.

As illustrated in FIG. 1, the Jerusalem cross type unit cell 11 is configured such that a cross-shaped conductive pattern is formed on a dielectric substrate 10. The unit cell 11 is disposed on the dielectric substrate 10 at the constant pitch p. The thickness of the conductive pattern is t.

The shape of the conductive pattern is a shape in which a horizontal pattern 12 having a width w and a length l and a vertical pattern 13 having the same dimensions form a cross and four electrode patterns 4 each having a width h and a length b are each formed at end portions of the horizontal pattern 12 and the vertical pattern 13. An end portion of such an electrode pattern 4 in a width h direction faces an electrode pattern 4 of an adjacent unit cell 11 with the same shape with a spacing of an inter-electrode distance d.

Each of the horizontal pattern 12 and the vertical pattern 13 forms an inductance L. Each of the four electrode patterns 4 forms a capacitance C between such an electrode pattern 4 and an electrode pattern 4 of an adjacent unit cell 11.

As described above, the shape of the unit cell 11 is specified by the pitch p of the unit cell 11, the width w of the horizontal pattern 12 and the vertical pattern 13, the length l of the horizontal pattern 12 and the vertical pattern 13, the width h of the electrode pattern 4, the length b of the electrode pattern 4, the thickness t of each conductive pattern, and the inter-electrode distance d.

Hereinafter, these parameters for specifying the shape of the unit cell 11 will be referred to as structural parameters. According to these structural parameters, the inductance L and the capacitance C of the unit cell 11 are represented by the following equations:

[Math. 1]

$$L = \mu_0 \frac{p}{2\pi} \log \frac{1}{\sin\left(\frac{\pi w}{2p}\right)} \quad (1)$$

$$C = \epsilon_0 \frac{2d}{\pi} \log \frac{1}{\sin\left(\frac{\pi d}{2p}\right)} + \epsilon_0 \frac{ht}{d} \quad (2)$$

Here, the pitch p is represented by p=l+d+2h.

Note that each of the values of the structural parameters may be set as follows. The inductance L is determined by the pitch p, and thus, the value of l/p may be, for example, about 0.7 to 0.9. In approximation of the inductance L, t<0.1 w may be taken assuming t<<w. w<<h≤about 0.1 to 0.3 p, d/p≥about 0.01, w<<h, and h/p>about 0.3 may be taken.

A theoretical value $f_{th}$ of the resonant frequency is represented by the following equation:

[Math. 2]

$$f_{th} = \frac{1}{2\pi\sqrt{LC}} \quad (3)$$

Figure 2:
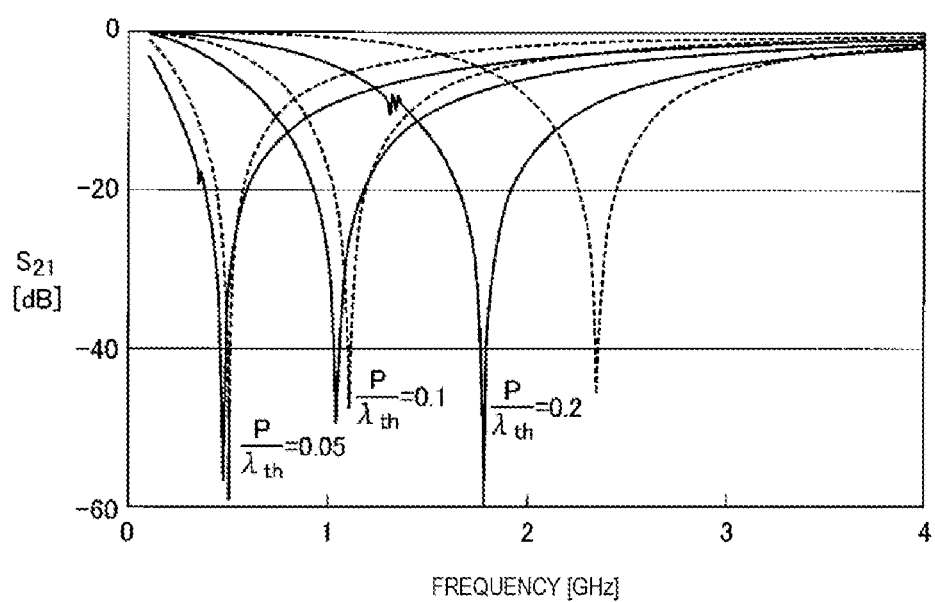
FIG. 2 is a graph illustrating a theoretical value $f_{th}$ of a resonant frequency and a resonant frequency obtained by electromagnetic field analysis.

FIG. 2 is a graph illustrating the theoretical value $f_{th}$ of the resonant frequency calculated by Equation (3) and the resonant frequency obtained by electromagnetic field analysis. The resonant frequency is indicated by frequency characteristics of an insertion loss $S_{21}$. In FIG. 2, a solid line is a result of the electromagnetic field analysis, and a dashed line is the theoretical value $f_{th}$. The parameter is the ratio p/λ of the pitch p of the unit cell 11 and an incident wavelength λ.

As shown in FIG. 2, there is a deviation between the result of the electromagnetic field analysis and the theoretical value $f_{th}$. Such a deviation increases as of the parameter p/λ increases.

Figure 3:
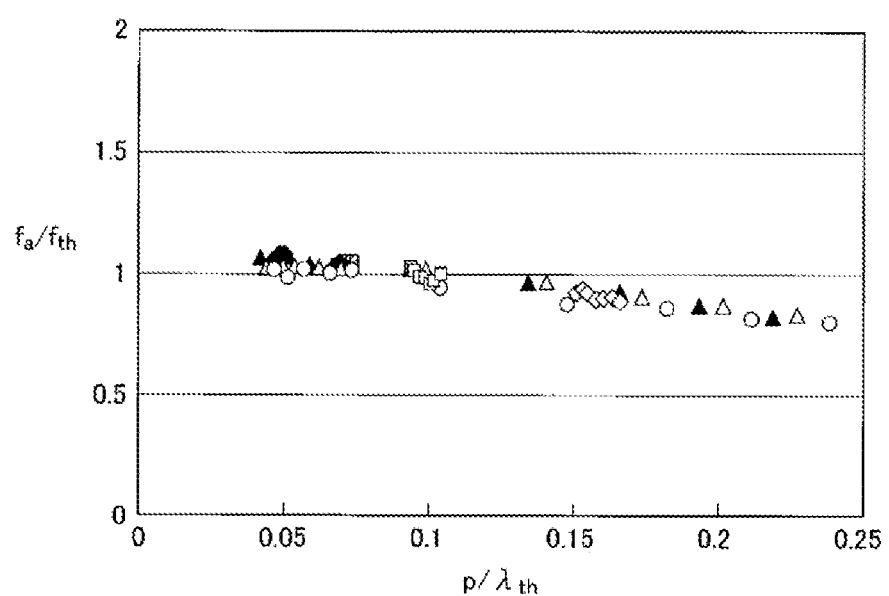
FIG. 3 is a graph illustrating a relationship between the ratio p/λ of the pitch p of the unit cell and an incident wavelength λ and the ratio $f_a/f_{th}$ of the resonant frequency $f_a$ obtained by the electromagnetic field analysis and the theoretical value $f_{th}$.

FIG. 3 is a graph illustrating a relationship between the ratio p/λ of the pitch p of the unit cell 11 and the incident wavelength λ and the ratio $f_a/f_{th}$ of the resonant frequency $f_a$ obtained by the electromagnetic field analysis and the theoretical value $f_{th}$. As illustrated in FIG. 3, the deviation of the resonant frequency from the theoretical value $f_{th}$ starts increasing from around p/λ=0.1, and when the pitch p of the unit cell 11 reaches ¼ times (0.25) as much as the wavelength of the theoretical value $f_{th}$, the resonant frequency $f_a$ obtained by the electromagnetic field analysis reaches about 70% of the theoretical value $f_{th}$. In other words, as the unit cell 11 becomes smaller, the deviation from the theoretical value $f_{th}$ increases.

A frequency selective surface design apparatus 100 according to the present embodiment is intended to reduce this deviation.

Hereinafter, embodiments of the present invention will be described with reference to the drawings. The same portions in a plurality of the drawings are denoted by the same reference signs, and a description thereof will not be repeated.

First Embodiment

Figure 4:
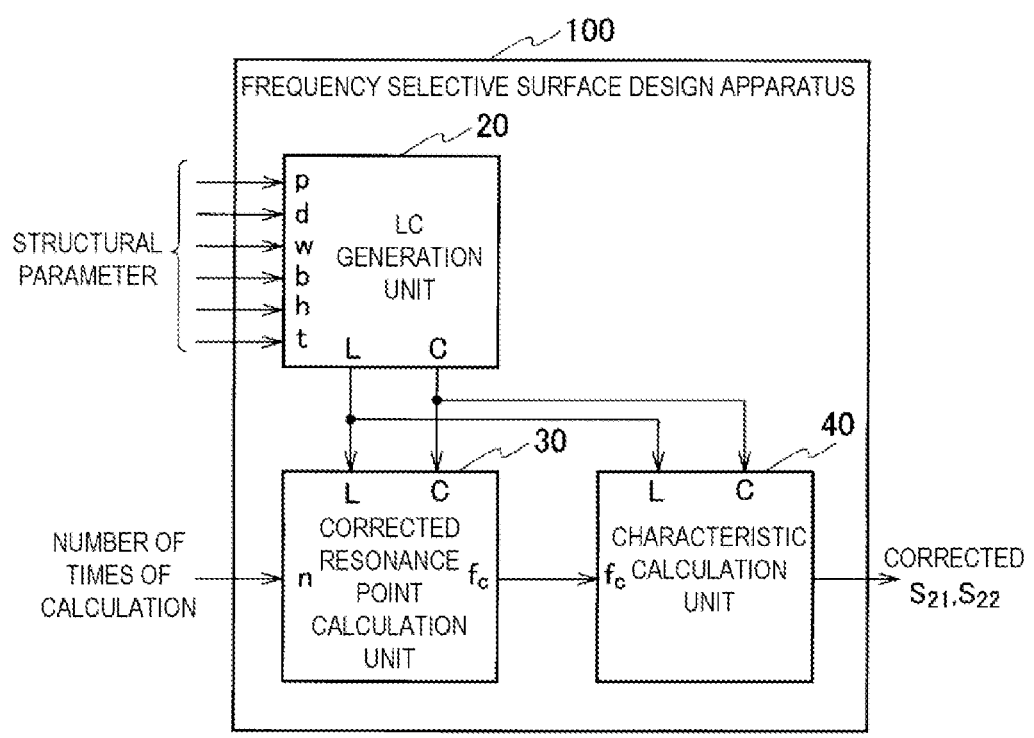
FIG. 4 is a block diagram illustrating a functional configuration example of a frequency selective surface design apparatus according to a first embodiment of the present invention.

FIG. 4 is a block diagram illustrating a functional configuration example of a frequency selective surface design apparatus according to a first embodiment of the present invention. The frequency selective surface design apparatus 100 illustrated in FIG. 4 includes an LC generation unit 20, a corrected resonance point calculation unit 30, and a characteristic calculation unit 40.

The frequency selective surface design apparatus 100 is, for example, realized by a computer including a ROM, a RAM, a CPU, and the like. When each functional component is realized by a computer, processing content of a function that each functional component should have is described by a program.

Figure 5:
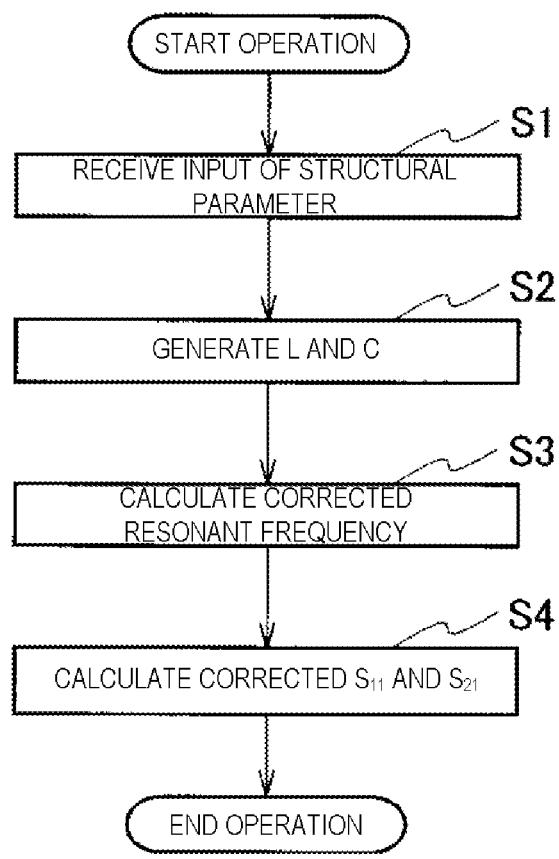
FIG. 5 is a flowchart illustrating a processing procedure of the frequency selective surface design apparatus illustrated in FIG. 4.

FIG. 5 is a flowchart illustrating a processing procedure of the frequency selective surface design apparatus 100. Operation of the frequency selective surface design apparatus 100 will be also described with reference to FIG. 5.

The LC generation unit 20 receives an input of the structural parameters representing the structure of the unit cell 11 (Step S1). The structural parameters are the pitch p of the unit cell 11, the width w of the horizontal pattern 12 and the vertical pattern 13, the length l of the horizontal pattern 12 and the vertical pattern 13, the width h of the electrode pattern 4, the length b of the electrode pattern 4, the thickness t of each conductive pattern, and the interelectrode distance d, as described above. The structural parameters are input by a user. Each structural parameter has a preferred range as described above.

Next, the LC generation unit 20 generates, based on the input structural parameters, the inductance L and the capacitor C according to Equation (1) and Equation (2) above (Step S2). The generated inductance L and the generated capacitor C are output to the corrected resonance point calculation unit 30 and the characteristic calculation unit 40.

The corrected resonance point calculation unit 30 models a correction circuit by using a circuit described below. The corrected resonance point calculation unit 30 receives inputs of the number n of times of calculation input from the outside and the inductance L and the capacitance C generated by the LC generation unit 20. Then, the correction circuit is modeled using the circuit in which a virtual capacitance $C_V$ is connected in parallel via a transmission line to each distribution inductance L/n obtained by division of the inductance L by the calculation number n and the transmission line is terminated at the capacitance C. The modeled correction circuit is illustrated in FIG. 6.

Figure 6:
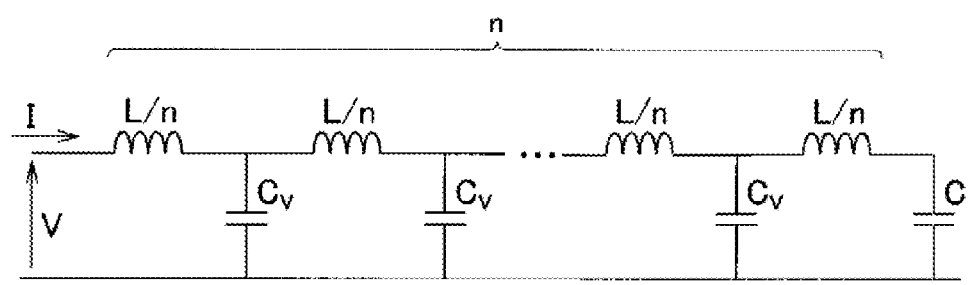
FIG. 6 is a diagram illustrating an example of a modeled correction circuit.

As illustrated in FIG. 6, the correction circuit is configured such that the virtual capacitor $C_V$ is connected in parallel to the distribution inductance L/n obtained by division of the inductance L by n to form the transmission line and the output of the transmission line is terminated at the capacitance C.

A phase difference $\Delta\varphi'$ generated in the correction circuit is determined by the following equation using a telegraphic equation:

[Math. 3]

$$\Delta\varphi' = k'\Delta x = \omega\sqrt{\left(\frac{L}{n}\right)C_v} \qquad (4)$$

An actual phase difference is herein considered in the Jerusalem cross type unit cell.

Figure 7:
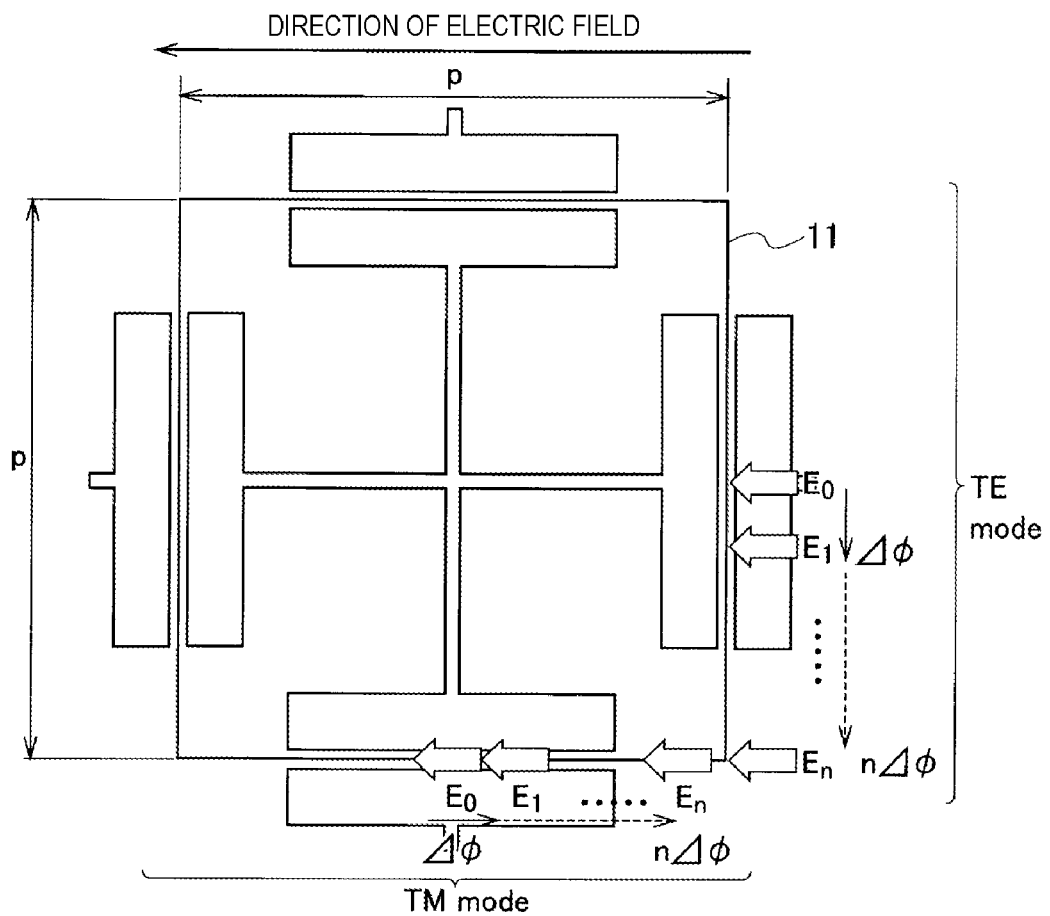
FIG. 7 is a plan view schematically illustrating the plane of the Jerusalem cross type unit cell.

FIG. 7 is a plan view schematically illustrating the plane of the Jerusalem cross type unit cell. As illustrated in FIG. 7, the electrode pattern 4 of the unit cell 11 is coupled to electrode patterns 4 of unit cells adjacent in vertical and horizontal directions with the capacitance C.

In FIG. 7, the phase difference generated when the half of the surface with respect to the center of the unit cell 11 is divided into n is represented by Equation (5).

[Math. 4]

$$\Delta\varphi = k\Delta x = \frac{\pi p}{n\lambda} \qquad (5)$$

Note that this phase difference (Equation (5)) is not taken into consideration in related art. For this reason, as the unit cell 11 becomes smaller, the deviation from the theoretical value $f_{th}$ increases (FIG. 3).

Thus, if the unit phase difference $\Delta\varphi'$ generated in the correction circuit is set to be equal to the actual unit phase difference $\Delta\varphi$ (Equation (6)), an appropriate resonant frequency can be calculated.

[Math. 5]

$$\omega\sqrt{\left(\frac{L}{n}\right)C_v} = \frac{\pi p}{n\lambda} \qquad (6)$$

The virtual capacitance $C_V$ is represented by Equation (7) when the virtual capacitance $C_V$ is obtained from Equation (6).

[Math. 6]

$$C_v = \frac{1}{nL}\left(\frac{kp}{2\omega}\right)^2 \qquad (7)$$

Equation (8) below is obtained considering coupling with an incident electromagnetic wave propagating with an electromagnetic wave dispersion relationship $kc_\theta=\omega$ in a free space.

[Math. 7]

$$C_v = \frac{1}{nL}\left(\frac{p}{2C_0}\right)^2 \qquad (8)$$

Here, $c_0$ is a light speed in vacuum. In other words, if the pitch p, the inductance L, and the division number n are determined, appropriate frequency design simulating actual characteristics is allowed. For example, the virtual capacitance $C_V \approx 0.0036$ pf is obtained assuming the pitch p=10 mm, n=50, L=$6.4 \times 10^9$ H.

In a case where the vertical and horizontal pitches p of the unit cell 11 are the same as each other, the same phase difference is generated in both of a TM mode and a TE mode, and thus, these modes are similarly applicable. Because the division number n represents the number of divisions of the correction circuit, a calculation amount increases as the division number increases, but accuracy can be increased. For the above-described phase matching condition derivation, a sufficiently-large division number n is assumed.

Figure 8:
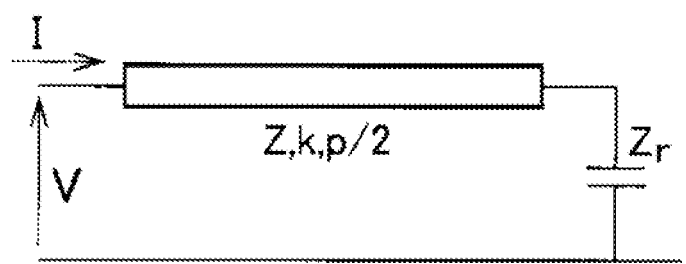
FIG. 8 is a diagram illustrating a transmission line for the correction circuit.

Considering the impedance in the correction circuit, $k\Delta x = k$ is taken assuming that the division number n is sufficiently large. In this case, the correction circuit can be represented by a transmission line illustrated in FIG. 8. The impedance Z' of the transmission line illustrated in FIG. 8 is represented by the following equation. Zr is the impedance of the capacitance C.

[Math. 8]

$$Z' = \frac{V}{I} = Z \frac{Z_r + jZ\tan\left(\frac{kp}{2}\right)}{Z + jZ_r\tan\left(\frac{kp}{z}\right)} \quad (9)$$

From a resonant condition of Z'=0, a relationship between a corrected resonant frequency $f_C$ and the pre-correction resonant frequency $f_{th}$ calculated by Equation (3) is represented by Equation (10) by using the ratio p/λ of the pitch p of the unit cell 11 and the resonant wavelength. Equation (10) means a correction factor.

[Math. 9]

$$\frac{f_C}{f_{th}} = \sqrt{\frac{\pi\left(\frac{p}{2}\right)}{\tan\pi\left(\frac{p}{2}\right)}} \quad (10)$$

Comparison between the resonant frequency obtained by the electromagnetic field analysis and the corrected resonant frequency $f_C$ obtained by Equation (10) were conducted while structural parameters of the unit cell 11 vary. Table 1 shows the structural parameters of the unit cell 11 subjected to the electromagnetic field analysis.

TABLE 1

| MODEL No. | l (mm) | h (mm) | p (mm) | d (mm) | $C_v$ (fF) |
|---|---|---|---|---|---|
| 1 | 7.0 | 6.0 | 10.0 | 1.0 mm | 0.069 |
| 2 | 7.5 | 6.0 | 10.0 | 0.5 mm | 0.138 |
| 3 | 7.0 | 6.5 | 10.0 | 1.0 mm | 0.074 |
| 4 | 12.5 | 10.0 | 15.0 | 0.5 mm | 0.023 |
| 5 | 12.6 | 10.0 | 15.0 | 0.4 mm | 0.029 |
| 8 | 12.5 | 11.0 | 15.0 | 0.5 mm | 0.025 |
| 7 | 12.6 | 11.0 | 15.0 | 0.4 mm | 0.032 |

Figure 9:
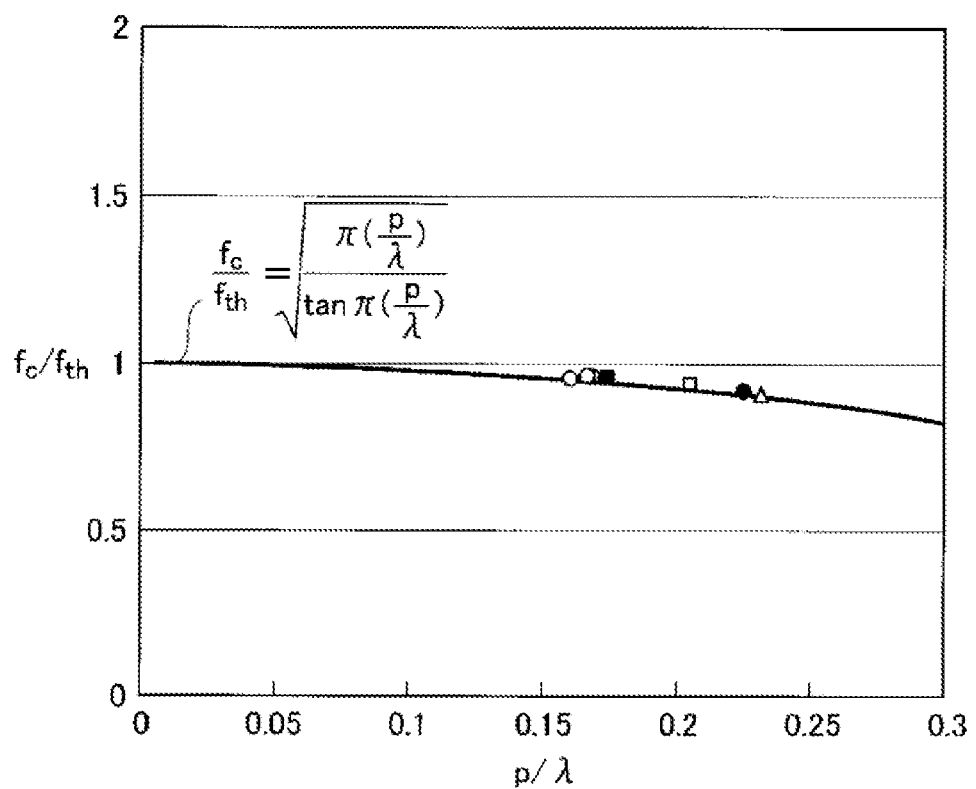
FIG. 9 is a graph illustrating the resonant frequency obtained by the electromagnetic field analysis and a correction coefficient.

FIG. 9 plots the resonant frequency obtained b the electromagnetic field analysis of the unit cell c with the structural parameters shown in Table 1, and shows the correction coefficient of Equation (10) by a solid line. The horizontal axis in FIG. 9 is the ratio p/λ of the pitch p of the unit cell 11 and the resonant wavelength, and the vertical axis is the correction coefficient $f_C/f_{th}$.

As shown in FIG. 9, a theoretical curve (Equation (10)) and the resonant frequency obtained by the electromagnetic field analysis are well matched. As described above, the correction coefficient causes the pre-correction resonant frequency $f_{th}$ and the corrected resonant frequency $f_C$ to favorably match with each other.

The characteristic calculation unit 40 receives inputs of the inductance L, the capacitance C generated by the LC generation unit 20 and the corrected resonant frequency $f_C$ calculated by the corrected resonance point calculation unit 30. Then, the characteristic calculation unit 40 calculates the pre-correction resonant frequency $f_{th}$ from the inductance L and the capacitance C, and obtains the correction coefficient by dividing the corrected resonant frequency $f_C$ by the pre-correction resonant frequency $f_{th}$. Further, the characteristic calculation unit 40 multiplies each of a pre-correction return loss and a pre-correction insertion loss by the correction coefficient, and calculates a corrected return loss and a corrected insertion loss (Step S4).

Figure 10:
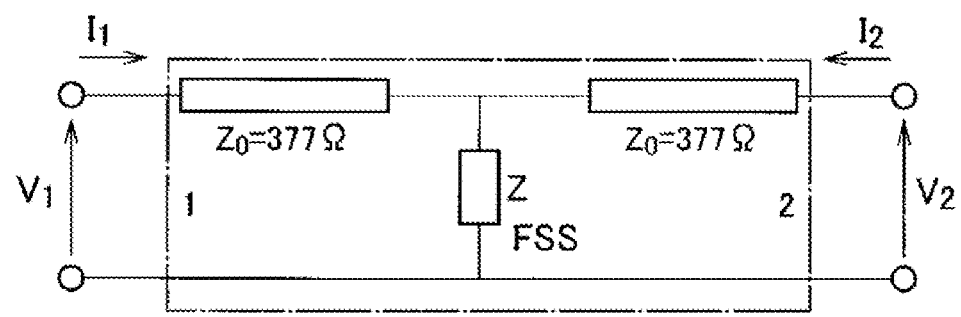
FIG. 10 is a diagram illustrating a four-terminal circuit.

The pre-correction resonant frequency $f_{th}$ is calculated from the frequency characteristics of $S_{11}$ and $S_{21}$ in a four-terminal circuit having an impedance Z including an LC series resonant circuit including the inductance L and the capacitance C. FIG. 10 is a diagram illustrating the four-terminal circuit.

$S_{11}$ represents the return loss of a terminal 1, and $S_{21}$ represents an insertion loss from the terminal 1 to a terminal 2. $Z_0$ illustrated in FIG. 10 is the characteristic impedance of the free space.

Next, the characteristic calculation unit 40 multiplies the frequency axes of $S_{11}$ and $S_{21}$ of the pre-correction resonant frequency $f_{th}$ by the correction coefficient $f_C/f_{th}$, and calculates $S_{11}$ and $S_{21}$ of the corrected resonant frequency $f_C$. According to this method, the value of L/C is kept constant, and the profile of the curve is not changed.

Figure 11:
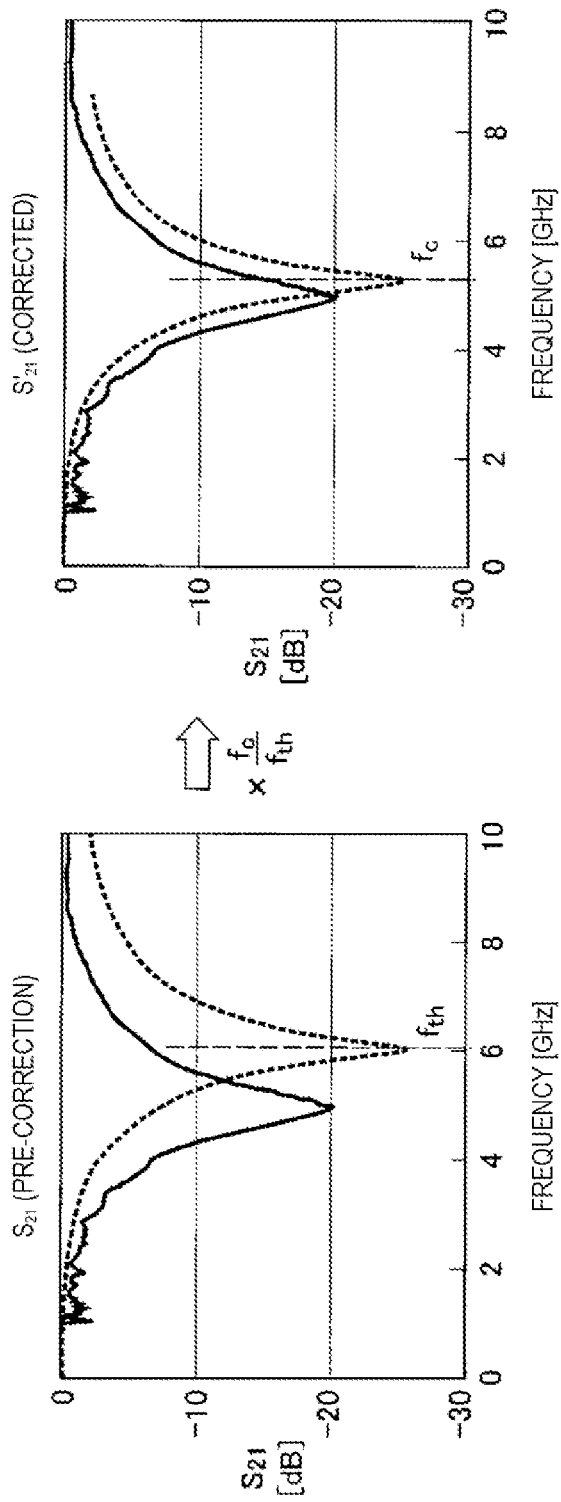
FIG. 11 is a graph schematically illustrating a state in which $S_{21}$ of the resonant frequency $f_C$ after correction is calculated by multiplying $S_{21}$ of the pre-correction resonant frequency $f_{th}$ by the correction coefficient $f_C/f_{th}$.

FIG. 11 is a graph schematically illustrating a state in which $S_{21}$ of the corrected resonant frequency $f_C$ is calculated by multiplying $S_{21}$ of the pre-correction resonant frequency $f_{th}$ by the correction coefficient $f_C/f_{th}$. An experiment result is indicated by a solid line, and a simulation result is indicated by a dashed line.

As shown in FIG. 11, the corrected resonant frequency is shown to be closer to the frequency of the experimental result (the solid line).

As described above, the frequency selective surface design apparatus 100 according to the present embodiment is the frequency selective surface design apparatus for supporting design of the frequency selective surface in which the unit cells 11 of the resonators are arranged on the plane, the frequency selective surface design apparatus including the LC generation unit 20, the corrected resonance point calculation unit 30, and the characteristic calculation unit 40. The LC generation unit 20 receives inputs of the structural parameters representing the structure of the unit cell 11, and generates the inductance L and the capacitance C of the unit cell 11. The corrected resonance point calculation unit 30 receives inputs of the calculation time n input from the outside, the inductance L and the capacitance C, models the correction circuit by means of the circuit in which the virtual capacitance $C_V$ is connected in parallel via the transmission line to each distribution inductance obtained by division of the inductance L by the calculation number n and the transmission line is terminated at the capacitance C. and calculates the corrected resonant frequency $f_C$ from the impedance of the correction circuit in which the virtual capacitance $C_V$ causes the phase difference generated in the unit cell 11 and the phase difference generated in the transmission line to match with each other. The characteristic calculation unit 40 receives inputs of the inductance L, the capacitance C, and the corrected resonant frequency $f_C$, calculates the pre-correction resonant frequency $f_{th}$ from the inductance L and the capacitance C, obtains the correction coefficient $f_C/f_{th}$ by dividing the corrected resonant frequency $f_C$ by the pre-correction resonant frequency $f_{th}$, and calculates the corrected return loss $S_{11}$ and the corrected insertion loss $S_{21}$ by multiplying each of the pre-correction return loss $S_{11}$ and the pre-correction insertion loss $S_{21}$ by the correction coefficient $f_C/f_{th}$.

With this configuration, the frequency characteristics can be accurately estimated from the structural parameters of the frequency selective surface.

Second Embodiment

Figure 12:
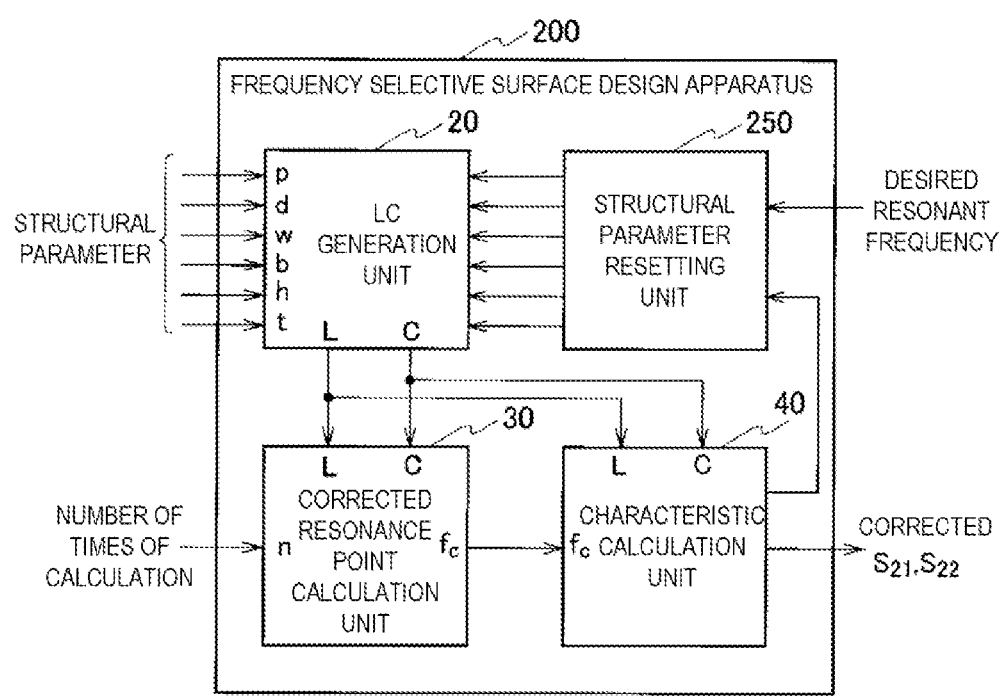
FIG. 12 is a block diagram illustrating a functional configuration example of a frequency selective surface design apparatus according to a second embodiment of the present invention.

FIG. 12 is a block diagram illustrating a functional configuration example of a frequency selective surface design apparatus according to a second embodiment of the present invention. The frequency selective surface design apparatus 200 illustrated in FIG. 12 is different from the frequency selective surface design apparatus 100 (FIG. 4) in that the frequency selective surface design apparatus 200 includes a structural parameter resetting unit 250.

Figure 13:
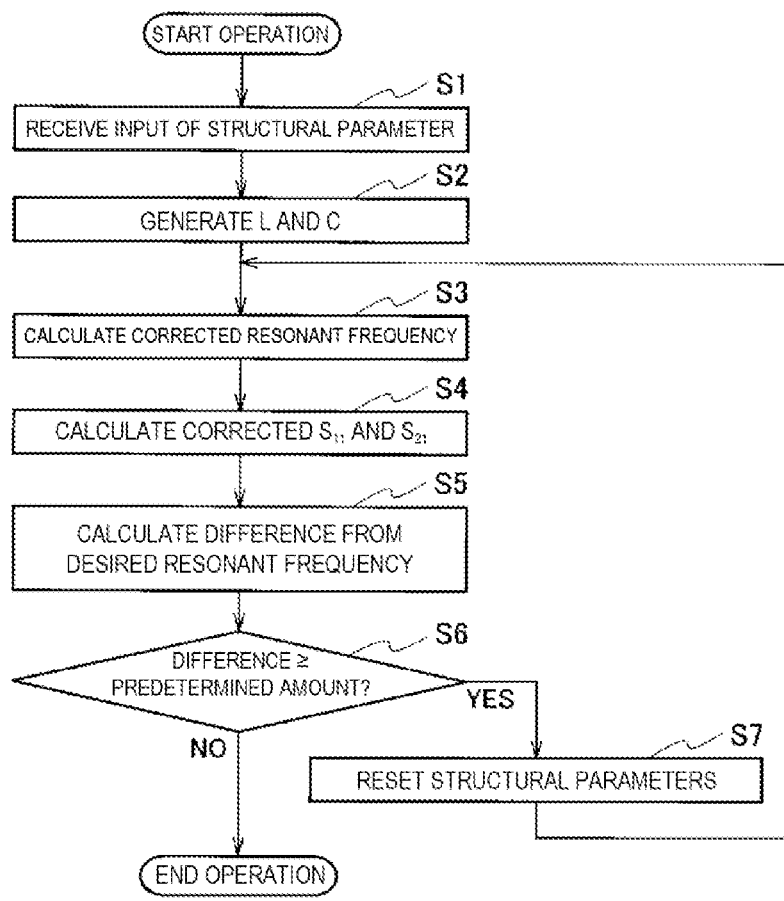
FIG. 13 is a flowchart illustrating a processing procedure of the frequency selective surface design apparatus illustrated in FIG. 12.

FIG. 13 is a flowchart illustrating a processing procedure of the frequency selective surface design apparatus 200. The processing procedure of the frequency selective surface design apparatus 200 is different from the processing procedure of the frequency selective surface design apparatus 100 in that Step S5 and subsequent steps are added.

The structural parameter resetting unit 250 calculates a difference between a desired resonant frequency $f_0$ input from the outside and the resonant frequency $f_C$ of a corrected return loss $S_{11}$ and a corrected insertion loss $S_{21}$ calculated by a characteristic calculation unit 40 (Step S5).

When the difference calculated by the structural parameter resetting unit 250 is smaller than a predetermined amount, the frequency selective surface design apparatus 200 ends operation (NO in Step S6). When the difference is larger than the predetermined amount, structural parameters are reset such that the difference becomes smaller (Step S7).

In resetting, any of the width w of a horizontal pattern 12 and a vertical pattern 13, the length l of the horizontal pattern 12 and the vertical pattern 13, the width h of an electrode pattern 4, the length b of the electrode pattern 4, the thickness t of each conductive pattern, and an inter-electrode distance d is newly set. When the difference is large, a structural parameter that determines a capacitance C is reset. For finely adjusting the difference, a structural parameter that determines an inductance L is reset.

When the difference is large, the inter-electrode distance d is changed. When the difference is small, the length l of the horizontal pattern 12 and the vertical pattern 13 or the length b of the electrode pattern 4 is changed.

As a changing method, in the case of decreasing the frequency, applying any or all of an increase in the length l of the horizontal pattern 12 and the vertical pattern 13, a decrease in the inter-electrode distance d, and an increase in the length b of the electrode pattern 4 is performed. In the case of increasing the frequency, a change is made in the opposite way.

After the structural-parameter resetting, Steps S3 to S7 are repeated until the difference becomes smaller than the predetermined amount. An existing algorithm such as a genetic algorithm (GA) can be used as an algorithm for optimizing this difference.

As described above, the frequency selective surface design apparatus 200 according to the present embodiment includes the structural parameter resetting unit 250. The structural parameter resetting unit 250 receives inputs of the corrected return loss and the corrected insertion loss calculated by the characteristic calculation unit 40 and the desired resonant frequency input from the outside. Then, the structural parameter resetting unit 250 obtains the difference between the corrected resonant frequency $f_C$ and the desired resonant frequency $f_0$, and performs the structural-parameter resetting from the difference. Further, the structural parameter resetting unit 250 repeats the structural-parameter resetting until the difference reaches the predetermined value. With this configuration, the frequency selective surface design apparatus 200 according to the present embodiment can increase the accuracy of frequency characteristics of a frequency selective surface.

As described above, according to the frequency selective surface design apparatuses 100, 200 according to the present embodiments, the frequency characteristics of the frequency selective surface can be quantitatively estimated. Note that in description of the embodiments above, the shape of the conductive pattern has been described in the example of the Jerusalem cross type (FIG. 1), but the present invention is not limited to these examples. The present invention can be applied as long as the inductance L and the capacitor C can be formulated using the structural parameters.

It is a matter of course that various embodiments and the like that are not described herein are also included in the present invention. Thus, the technical scope of the present invention is defined only by the subject matters according to the claims that are appropriate from description above.

REFERENCE SIGNS LIST 1, 2 Terminal
10 Dielectric substrate
11 Unit cell
20 LC generation unit
30 Corrected resonance point calculation unit
40 Characteristic calculation unit
100, 200 Frequency selective surface design apparatus
250 Structural parameter resetting unit

The invention claimed is:

1. A frequency selective surface design apparatus comprising:
   a frequency selective surface in which a unit cell of a resonator is arranged on a plane;
   an LC generation unit, including one or more processors, configured to receive an input of a structural parameter representing a structure of the unit cell, and generate an inductance and a capacitance of the unit cell;
   a corrected resonance point calculation unit, including one or more processors, configured to receive inputs of a number of times of calculation input from an outside, the inductance, and the capacitance, model a correction circuit by using a circuit in which a virtual capacitance is connected in parallel via a transmission line to each of distribution inductances obtained by division of the inductance by the number of times of calculation and the transmission line is terminated at the capacitance, and calculate a corrected resonant frequency from an impedance of the correction circuit in which the virtual capacitance causes a phase difference generated in the unit cell and a phase difference generated in the transmission line to match with each other; and a characteristic calculation unit, including one or more processors, configured to receive inputs of the inductance, the capacitance, and the corrected resonant frequency, calculate a pre-correction resonant frequency from the inductance and the capacitance, obtain a correction coefficient by dividing the corrected resonant frequency by the pre-correction resonant frequency, and calculate a corrected return loss and a corrected insertion loss by multiplying each of a pre-correction return loss and a pre-correction insertion loss by the correction coefficient.

2. The frequency selective surface design apparatus according to claim 1, wherein
the unit cell includes a conductive pattern in which a first conductive pattern is formed in a cross shape on a dielectric substrate, a horizontal pattern and a vertical pattern forming the cross shape extend in each direction by a predetermined length, and at ends of the horizontal pattern and the vertical pattern extending by the predetermined length, second conductive patterns with a larger width than widths of the horizontal pattern and the vertical pattern extends by a predetermined length in both directions on the dielectric substrate orthogonal to each other are provided, and
the structural parameter specifies a shape of the conductive pattern.

3. The frequency selective surface design apparatus according to claim 1, wherein
the distribution inductances are values obtained by equal division of the inductance by n which is the number of times of calculation,
the virtual capacitance is a value obtained from a phase matching condition for equalizing a unit phase difference of the transmission line and a phase difference generated in division of a half of a surface of the unit cell with respect to a center of the unit cell by the n, and
the corrected resonant frequency is a lowest one of a plurality of calculated resonant frequencies.

4. The frequency selective surface design apparatus according to claim 1, wherein
the pre-correction resonant frequency is a resonant frequency of an LC series resonant circuit in which the inductance and the capacitance are connected in series.

5. The frequency selective surface design apparatus according to claim 1, further comprising: a structural parameter resetting unit, including one or more processors, configured to receive inputs of the corrected return loss and the corrected insertion loss calculated by the characteristic calculation unit and a desired resonant frequency input from the outside, obtain a difference between the corrected resonant frequency and the desired resonant frequency, and perform structural-parameter resetting from the difference, wherein the structural parameter resetting unit is configured to repeat the structural-parameter resetting until the difference reaches a predetermined value.

* * * * *